(12) United States Patent
Young (10) Patent No.: US 8,412,792 B2
(45) Date of Patent: Apr. 2, 2013

(54) NETWORK FILE TRANSFER AND CACHING SYSTEM

(76) Inventor: Brent Young, San Diego, CA (US)

( * ) Notice: Subject to any disclaimer, the term of this patent is extended or adjusted under 35 U.S.C. 154(b) by 442 days.

(21) Appl. No.: 11/831,714

(22) Filed: Jul. 31, 2007

(65) Prior Publication Data

US 2009/0037519 A1 Feb. 5, 2009

(51) Int. Cl.
*G06F 15/16* (2006.01)
(52) U.S. Cl. ......... 709/217; 709/206; 709/231; 709/237
(58) Field of Classification Search .......... 709/217–229, 709/238, 206; 705/51; 711/133, 100; 707/202, 707/10, 752
See application file for complete search history.

(56) References Cited

U.S. PATENT DOCUMENTS

| | | | |
|---|---|---|---|
| 5,706,502 A | 1/1998 | Foley | |
| 6,330,572 B1 | 12/2001 | Sitka | |
| 6,622,151 B1* | 9/2003 | Hamamoto et al. | 707/202 |
| 6,701,324 B1* | 3/2004 | Cochran et al. | 707/752 |
| 6,769,019 B2* | 7/2004 | Ferguson | 709/219 |
| 7,113,948 B2 | 9/2006 | Jhingan | |
| 7,159,005 B1 | 1/2007 | Baber | |
| 7,159,013 B2 | 1/2007 | Cudd | |
| 2001/0052019 A1* | 12/2001 | Walters et al. | 709/231 |
| 2002/0049853 A1* | 4/2002 | Chu et al. | 709/237 |
| 2002/0165954 A1* | 11/2002 | Eshghi et al. | 709/224 |
| 2003/0009540 A1* | 1/2003 | Benfield et al. | 709/220 |
| 2003/0097410 A1* | 5/2003 | Atkins et al. | 709/206 |
| 2004/0044723 A1* | 3/2004 | Bell et al. | 709/203 |
| 2005/0210181 A1* | 9/2005 | Depke et al. | 711/100 |
| 2006/0184540 A1* | 8/2006 | Kung et al. | 707/10 |
| 2007/0016688 A1* | 1/2007 | Hester et al. | 709/238 |
| 2007/0038812 A1* | 2/2007 | Miller et al. | 711/133 |
| 2007/0239611 A1* | 10/2007 | Blum | 705/51 |
| 2007/0271344 A1* | 11/2007 | Danasekaran et al. | 709/206 |
| 2008/0005027 A1* | 1/2008 | Mullins | 705/51 |

* cited by examiner

*Primary Examiner* — Ian N Moore
*Assistant Examiner* — Kiet Tang
(74) *Attorney, Agent, or Firm* — Mark Wisnosky; Robert Kansy (57) ABSTRACT

A network file transfer and caching system is presented. The system provides multiple access utilities to select and transfer files to other users. The system is of particular use where the size of the files precludes transfer by other means such as e-mail attachments. The system is uniquely integrated into the operating systems by providing right click context menu file selection and process initiation. New utilities enable improved workflow by providing download information without the need to wait for completion of the network transfer process. Network transfer processes may progress in the background without user oversight or intervention. Files are cached and securely available to selected receivers of the files. The caching process may be managed by selected parameters related to number of downloads and time limits for availability of downloads.

19 Claims, 12 Drawing Sheets

NETWORK FILE TRANSFER AND CACHING SYSTEM

TECHNICAL FIELD

Embodiments of the invention relate to transfer of data files between computer processors that are connected to a network and user interfaces to effect and manage the transfers.

BACKGROUND OF THE INVENTION

The use of computer processors that are interconnected through networks has become ubiquitous. Processors are used for both personal and commercial scale business and for personal entertainment. Many of the uses require transfer of data files amongst users. As software and hardware technology have progressed, the size of image, video, music, data and other files have increased. Often the size of these files precludes transfer through attachment to an e-mail communication. Networked based file transfer processes where a server is used as an intermediary for storage and transfer to multiple users is a solution to this problem and is known in the art. However such known systems are generally cumbersome to use and require the user to work outside of their common operating environment and disrupt the normal flow of work on a personal computer. Typical systems are web based, where the user is required to open an internet access program such as Internet Explorer®, log into a secure system and select and upload files which then emails a uniform resource locator (URL) for the file location to the recipient. This interrupts the flow of work on the computer and forces the user to communicate with recipients without the use of their typical communication systems such as email or instant messaging. Often files that are to be transferred are located in multiple folders or locations either on the sender's local drive or even on remote storage locations. Current systems require moving the files first to a common folder location and then uploading or even uploading the files one at a time. File transfers for these large files are dependent upon the type of network connection, network traffic and may take a long time. Workflow is interrupted waiting for the upload to complete before resuming other work.

A system is needed to provide others immediate access to the unique resource location while allowing the transferring party to resume work on his computer. When transferring files to others it is often important to know that they have received the file. When transferring to a group of people it is often important to know when the entire group has accessed the transferred file(s). A system is needed to provide easy access to the status of the file transfer process and the recipient's retrieval attempts. There are times when the sender or receiver of shared files is working at his normal "home" location and there are times when they are working away from that location; perhaps not even using their own computer. A system is needed that allows access to files and management of the transfer process both when working locally and when working remotely. The management system and user interface for file transfer systems needs improvement.

SUMMARY OF THE INVENTION

A network file transfer and caching system, including a unique user interface that addresses the shortcomings of the prior art is presented. The system allows users to initiate file transfers to other selected users through multiple software utilities. In one embodiment of the invention, a downloaded program is accessed to effect file selection, transfer and management of the transfer process and status. In another embodiment the transfer process is integrated into the right click context menu of the operating system. Files may be selected with for example Windows File Manager® program and a right click will effect their selection for transfer. Another embodiment of the invention allows selection of files from diverse locations accessible by the computer. The diversely located files are then grouped into a common zip file and transferred. The files need not be moved from their original location. The invention also enables improved workflow management.

Another embodiment of the invention provides access to the URL for the file transfer location immediately upon selection of the file(s). The URL may be included into communication documents and e-mailed or otherwise communicated to intended receivers of the files all while the transfer process tales place in background processing. There is no need to wait for the file transfer to complete before resuming other work on the local processor. Another embodiment allows management of the transfer process through the various user interfaces already mentioned. The transfer process may be interrupted and restarted at times more convenient such as when a faster network connection is available.

Another embodiment provides status and ability to manage transfers that are in progress. In another embodiment, the transferor may select to transfer files when accessing the system through a web based interface. Such transfers may be particularly useful when the transferor is traveling away from his normal work or home location. Embodiments include both a transfer process that provides immediate access to the URL location of the transferred files that may be communicated to others by a variety of means and a transfer process that will automatically e-mail the URL of the transferred files to selected recipients.

Another embodiment of the invention manages the caching of the files selected for transfer. Files are available for download by selected receivers of the files for a limited time. Another embodiment limits the availability of files for downloads to a selected number of downloads. In another embodiment of the invention the download process may be disabled thus overriding otherwise selected caching parameters.

BRIEF DESCRIPTION OF THE DRAWINGS

In order that this invention can be more readily understood, reference will now be made by way of example to the accompanying drawings.

DETAILED DESCRIPTION

Figure 1:
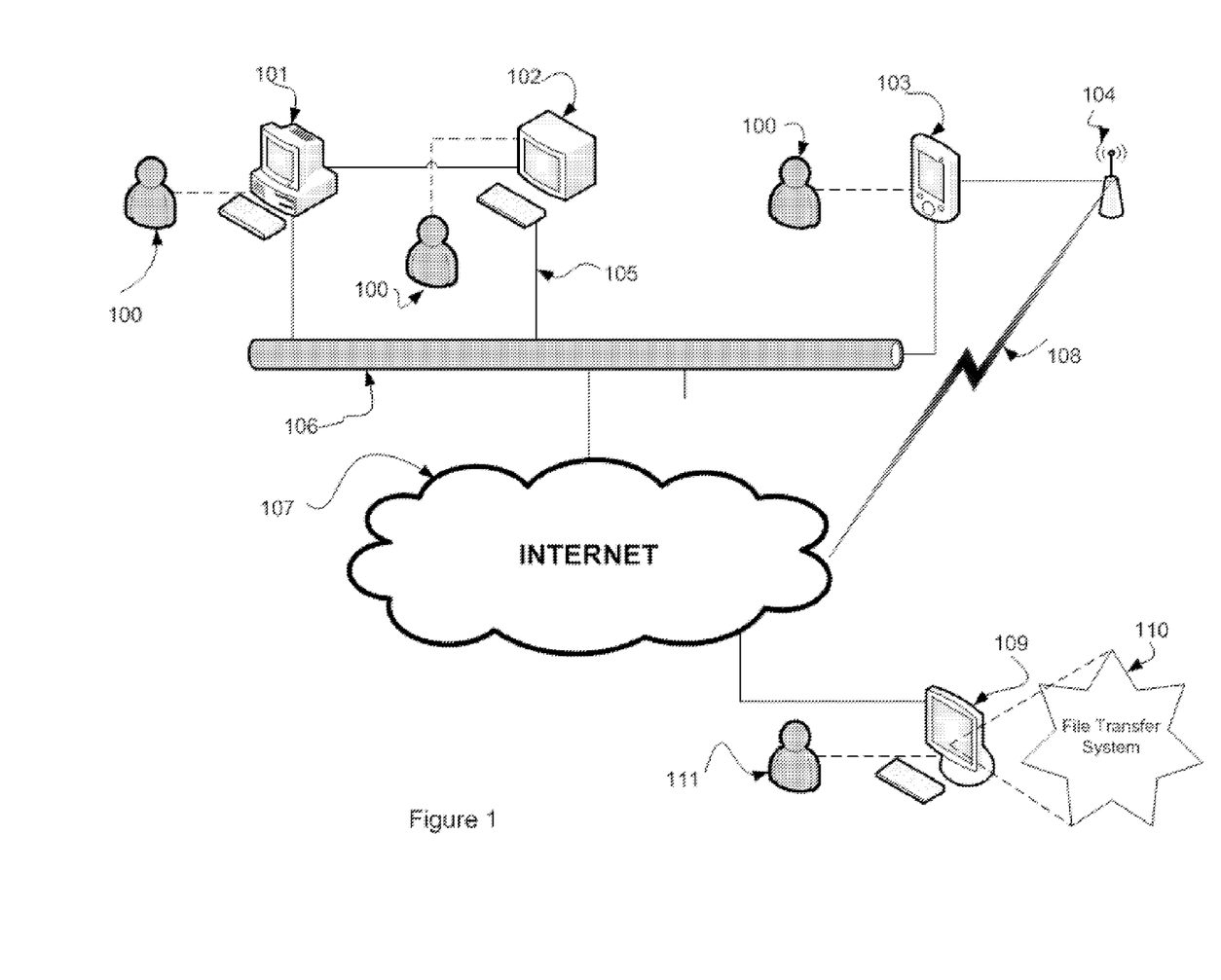
FIG. 1 is a block diagram of a computer network consistent with the invention.

FIG. 1 depicts a networked computer environment consistent with an embodiment of the invention. Multiple users 100 simultaneously connect to each other and to a server system 109 upon which embodiments of the invention operate and which may act as an intermediary storage location for file transfers. The multiple users are attached to the network of other users through for example local network connections 105 and the internet 107. Non-limiting exemplary computing means to operate the invention include personal computers 101, data terminals 102, and personal digital assistants 103. The connection between users may be hard-wired 105 or through wireless or cellular connections 104, 108. There are additional users 111 who are administrators operating and maintaining the file transfer and caching system 110.

Files to be transferred and cached may be located on a single processor such as 101. In another embodiment multiple files to be transferred and cached may be located in diverse location such as separate processors 101 and 102 or even other networked devices 103. Embodiments do not require moving of the files to a common processor's memory location prior to transfer and caching.

Figure 2:
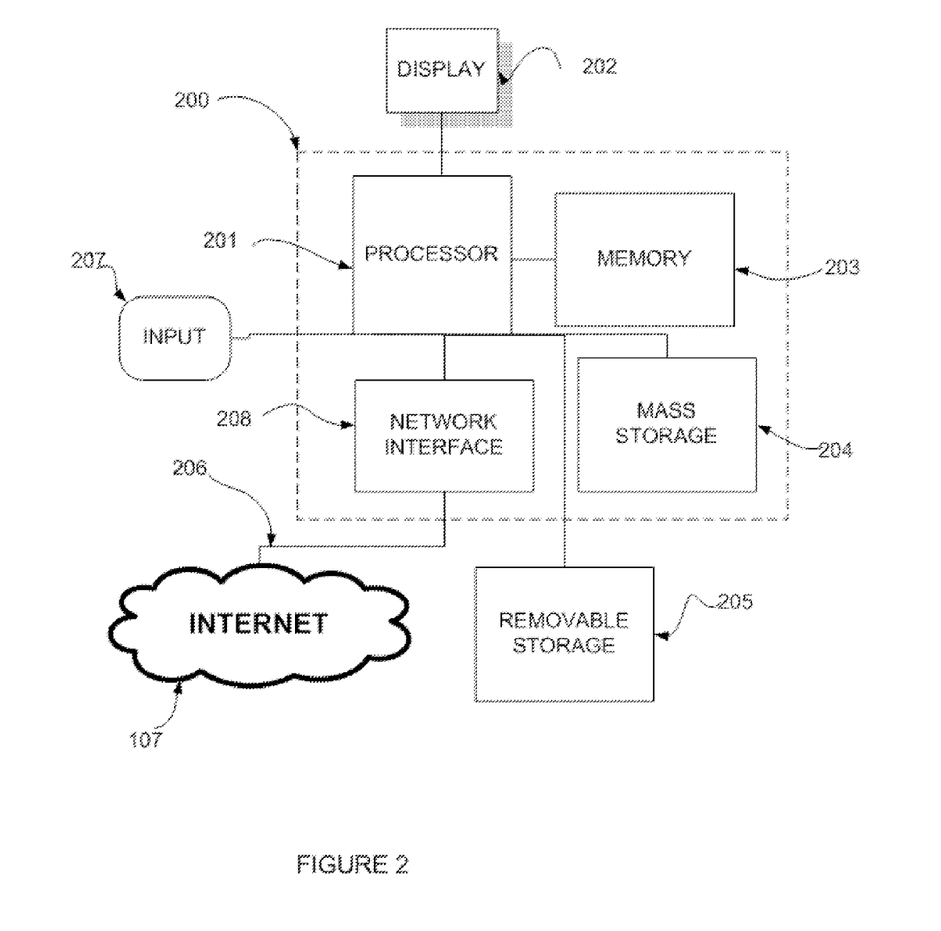
FIG. 2 is a block diagram of exemplary computing environment consistent with the invention and representative of a single computing device of FIG. 1.

FIG. 2 depicts a typical hardware and software environment for one of the computing means of FIG. 1. The computer 200 will include a user input device 207 such as a keyboard, mouse or keypad by which variously a sender or receiver of files may effect the software embodiments of the invention. In some embodiments of the invention a mouse with multiple button program interface (not shown) may be used to access embodiments of the invention. The algorithms of the invention may be encoded in storage medium that may either be fixed memory 203 such as random access memory or read-only memory. The algorithms may also be stored on mass storage medium such as a hard disk drive 204. Similarly removable storage media 205 such as magnetic or optical disks may also contain the encoded algorithms of the invention. Whatever the storage means, it is typically connected to a processor that 201 that is able to receive and execute the encoded commands of the invention and communicate results to a local display 202. Input and output communication may also be effected remotely through for example a network interface 208 and connection 206 to the internet 107. The connection 206 may be, as discussed in FIG. 1 above, both wired and wireless and may be through a local network or wide are network.

Figure 3:
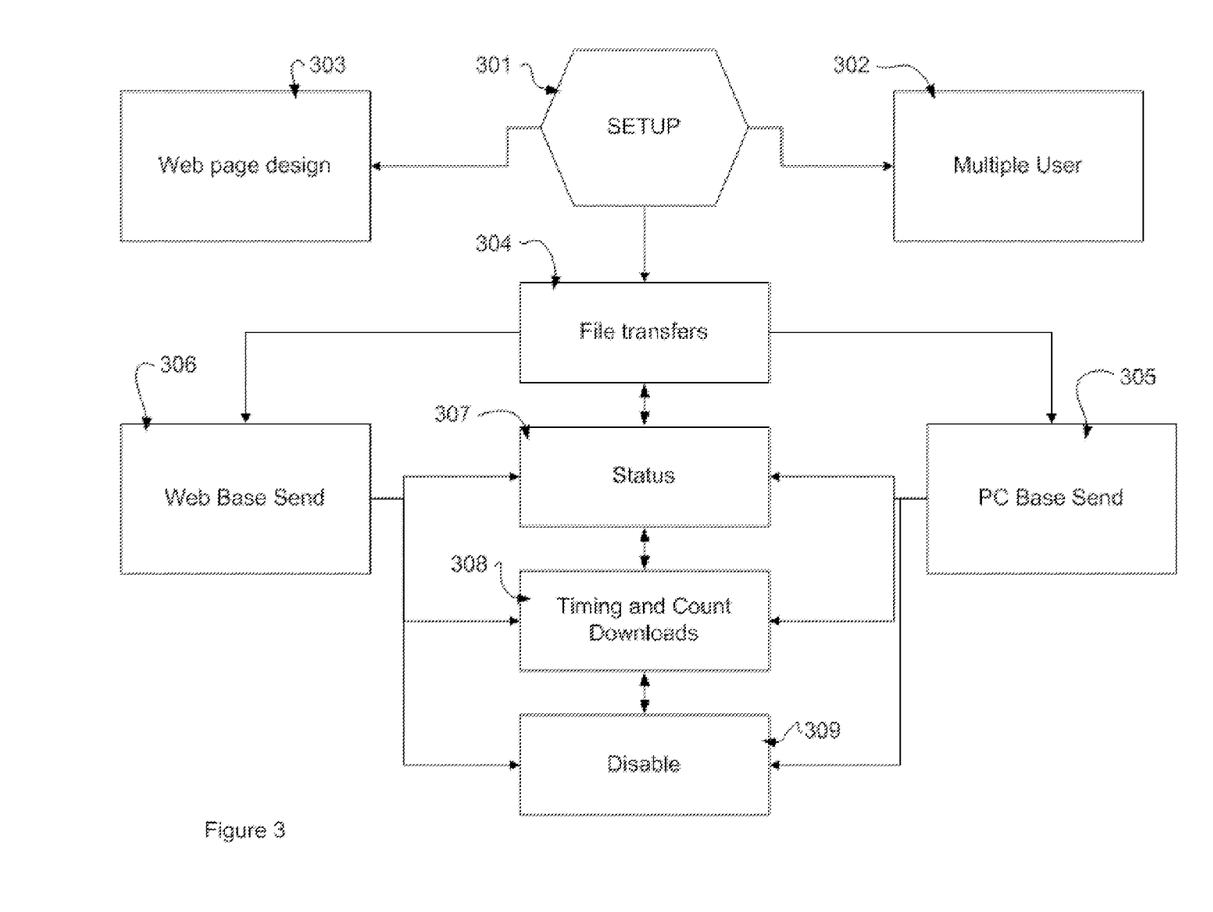
FIG. 3 is a block diagram of the major components of an embodiment of the invention.

FIG. 3 depicts block diagram components included in various embodiments of the invention. A setup process 301 enables users to sign up for use of the service and is typically a required firsts step. Setup is typically accomplished through internet access to the URL of the file transfer service provider. Another embodiment of the invention 302 allows multiple users to share a single account. A first user may sign up and enable file transfer access for both himself and multiple colleagues. A web design embodiment of the invention 303 allows a user to customize the look of the web page that is accessed by receivers of the transferred files. This may be done for example to include branding and other messaging to intended receivers of the transferred files. Further embodiments include the file transfer algorithms 304. The algorithms provide secure, encrypted, interruptable, restartable file transfer protocols. The algorithms also interact with the user interfaces to provide both web based embodiments 306 which require no software download to the users' local processor and PC based algorithms 305 which are effected through downloaded and installed software operating on the users' local processor. Such latter PC based send algorithms further include user interface embodiments that include access by both starting a program that effects the transfers and fully integrated right click context menu access to invented features. The file transfer algorithms 304 include embodiments for downloading files by a user and intended receiver of files as well as the selection of files and uploading process. Both the PC based Send 305 and Web based send 306 interact and transfer information to embodiments that provide status 307 information to the user 307. Status information includes for example status of active transfers for example progress on an upload, whether an upload has been interrupted, as well as history of past file sets selected for transfer, the date of that selection, and the number of times the particular file sets have been downloaded by receiving parties. Additional embodiments include file caching algorithms 308 wherein the number of transfers may be limited by a certain number of downloads or a timing for example only allowing downloads for a fixed time period. Another embodiment includes a disable feature 309 that allows the user to stop access to the files. In effect overriding the timing and download count control for access to the file system.

Figure 4:
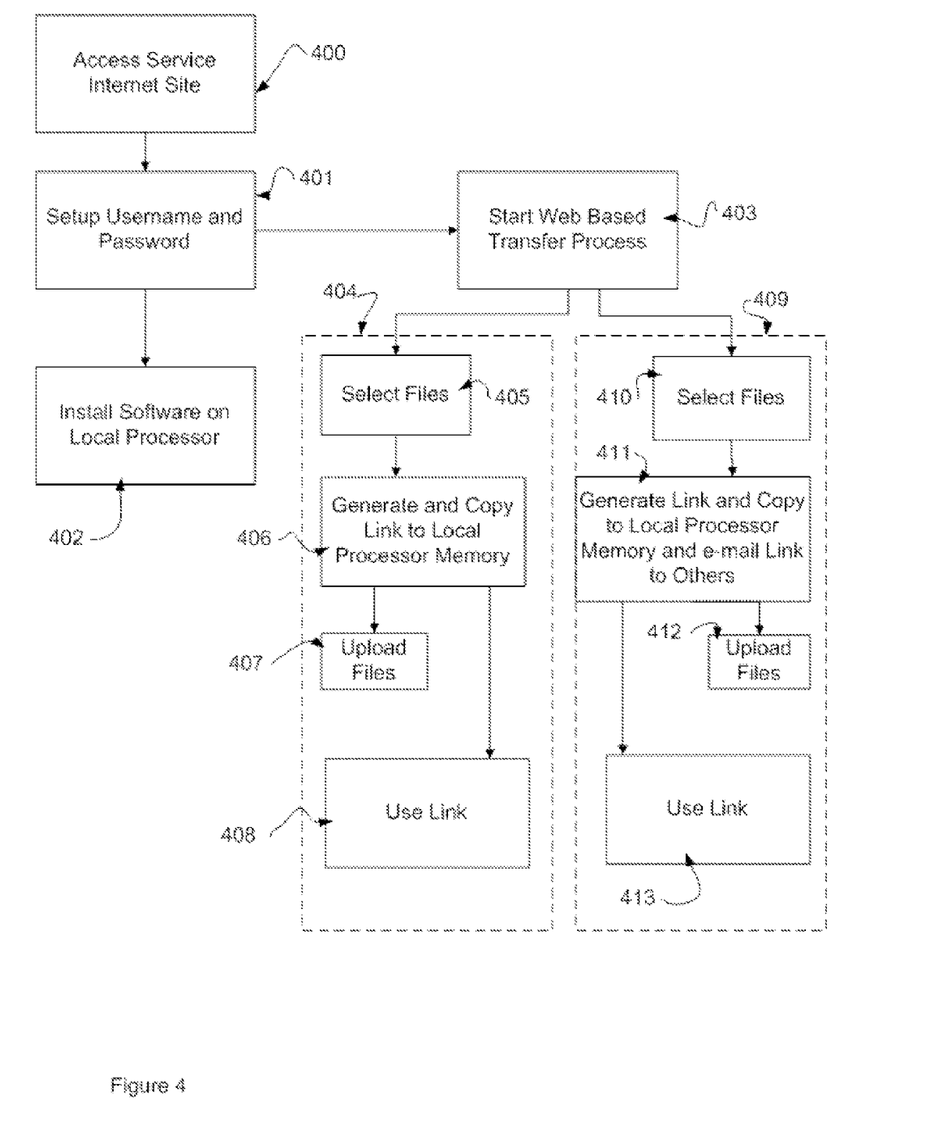
FIG. 4 is a block diagram of web based embodiments of the invention.

FIG. 4 depicts a block diagram of embodiments of the invention for setup and using a web based transfer process. A User will access the system 400 typically through entering the URL for the transfer service provider in commonly available programs such as Internet Explorer® or Safari®. A setup program 401 allows the user to define a username and password as security measures for managing the file transfer process. Another embodiments enables multiple users to be setup under the same primary account. Each user may have unique username and password. Another embodiment further included in the setup program allows users to design or customize the web page location that file receivers will see when accessing files offered for transfer. Another embodiment linked to the setup process allows user to download and install software for use on their local processor 402. Such software may then be used to access and control the file transfer process without need to access the web. Once set up the user may then begin to access the services enabled by various embodiments of the invention.

A web based transfer process starts 403 with access to the URL of the service provider web page. Embodiments of the invention include multiple transfer processes 404, 409. In one embodiment 404 files are selected 405 through a file browse process and added to a list of files to be transferred. Once selection is complete an upload process is selected through the user interface that generates a link to the transferred file URL location and copies the link into the local memory of the users processor. This link is then immediately available to add to communications, memos, e-mails and other exemplary uses of such a link 408. Simultaneously and in the background the files are uploaded 407 from the sender's various file locations to the service providers' server system. Once upload is complete intended receivers of the files may then download the files (not shown) through access to the URL associated with a particular transfer. The URL generated is unique to a particular file selection and transfer event. A single user may initiate multiple of such events. Access is limited through the URL identifier to the intended receivers of the files. Each set of files transferred may have a unique set of intended receivers. Separate file transfer selections are visible only to the users who initiate the file transfer process thus maintaining a secure environment for the transfer.

Another embodiment of the invention includes a similar but separate web based transfer process 409. Files are selected 410 similarly to as discussed above through a browse process. Once the selection set is complete a unique URL link for the particular transfer is generated 411 and automatically e-mailed to selected receivers of the file set. Additionally the URL link is copied into local memory of the user's processor for use in other communications, memos, etc 413. Simultaneously and in the background the files are uploaded 412. The upload processes for both web based embodiments 407, 412 include embodiments of interruptable and restartable file transfers. Embodiments of the web based processes allow the user to continue other work on their processor.

Figure 5:
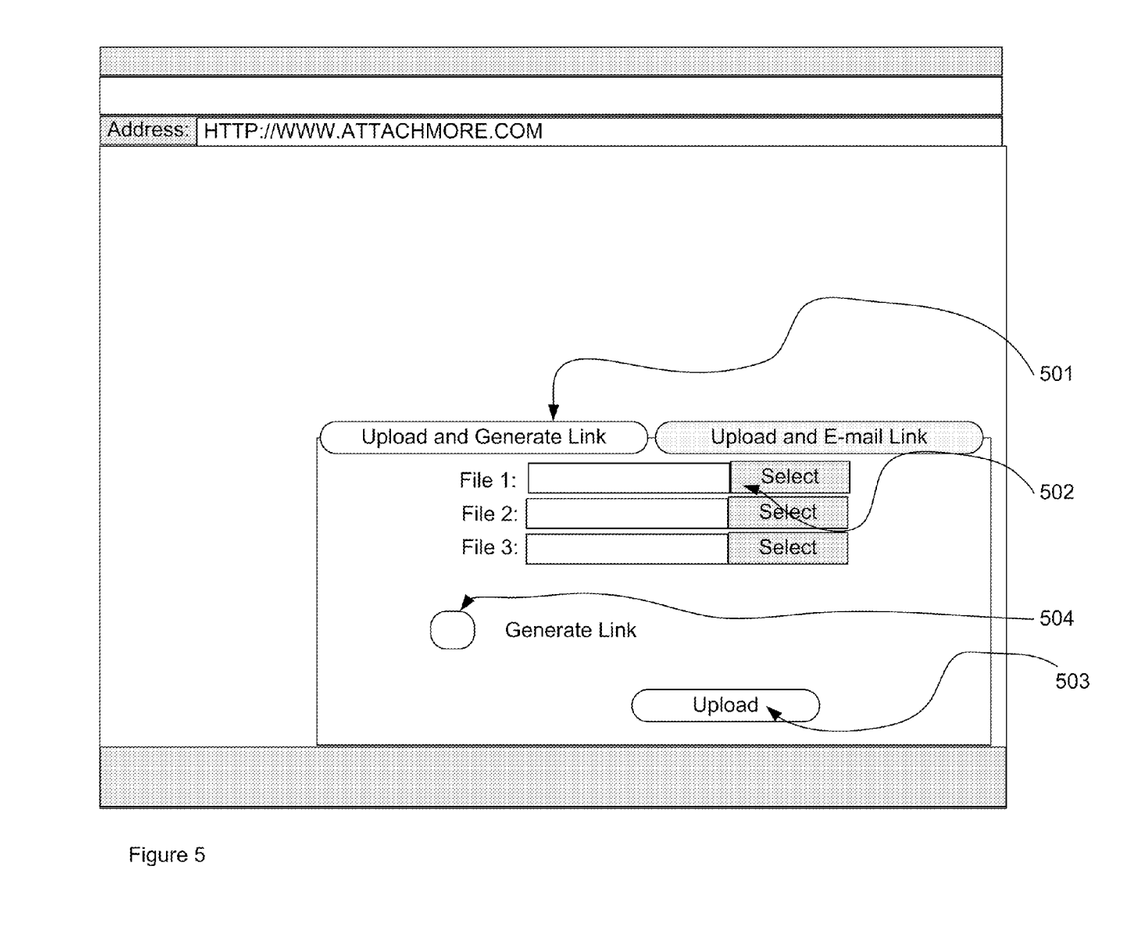
FIG. 5 is a screen image consistent with web based embodiments of the invention.
Figure 6:
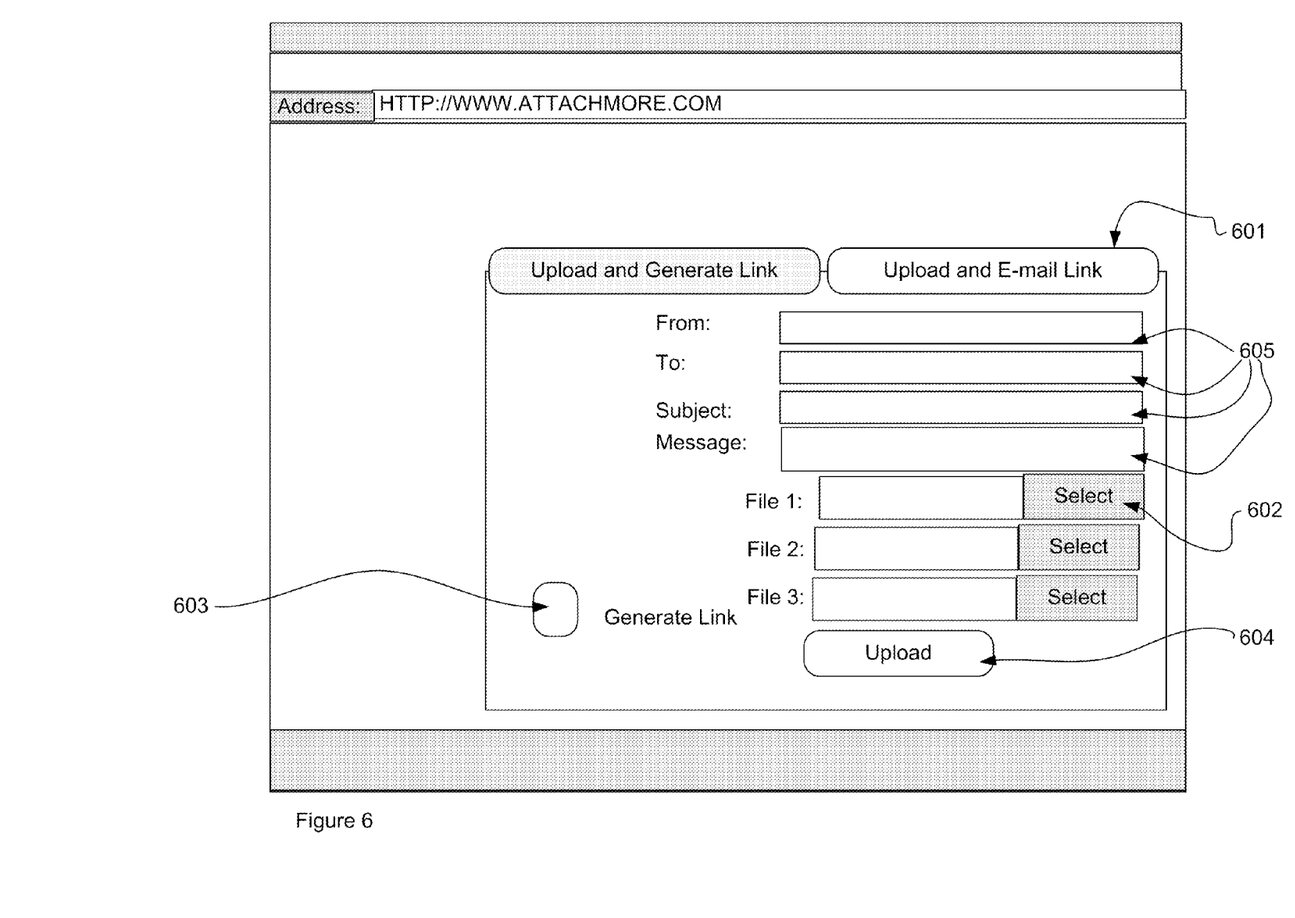
FIG. 6 is a screen image consistent with additional, e-mail integrated, web based embodiments of the invention.

FIGS. 5 and 6 provide further clarity to the web based embodiments 404 and 409 respectively. FIG. 5 depicts a screen image consistent with embodiments using the web based process depicted in FIG. 4, 404. The particular process to be used is selected through a user interface selection means, here depicted as selecting a tab 501. The files are selected through another user interface means, here depicted as a button 502 that initiates the browse feature to select files to which the user may have access. Once selected the user indicates completion here exemplified by selection of the upload button 503. In another embodiment the download link may optionally be presented by a user indication here exemplified by a checkbox 504. FIG. 6 depicts an alternative embodiment discussed above in conjunction with FIG. 4, 409. A user selects this alternative through some indication means 601. Selection presents the user with the typical components of an e-mail message 605 to be filled out as a selection of particular receivers of the transferred files. The message includes appending of the URL for the link to the files to allow the receiver easy access to download the selected file set. As before files are selected 602 through a browse process and upload is initiated 604. Another embodiment 603 allows optional separate generation of the transferred file set URL for use otherwise by the sender in additional separately sent e-mail, memos, etc.

Figure 7:
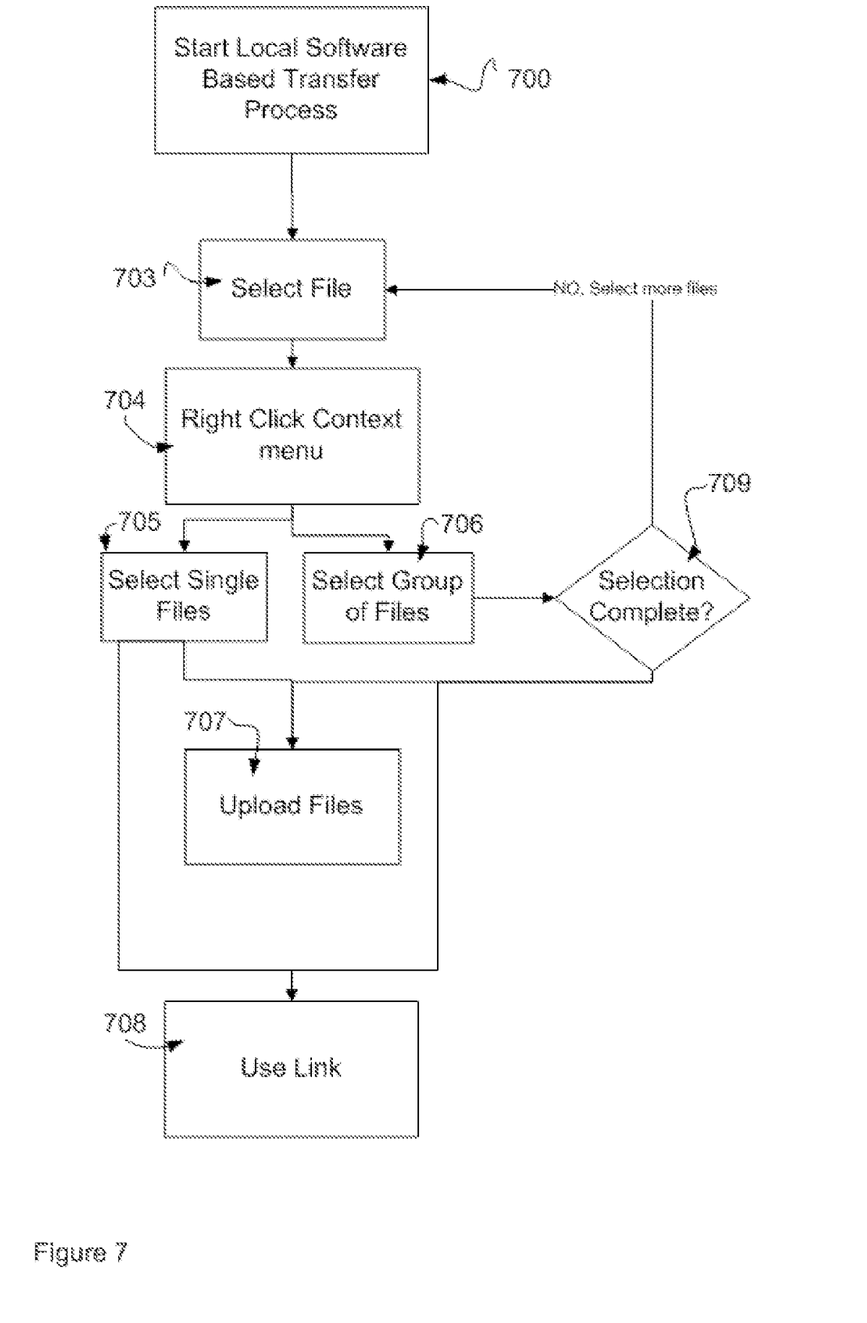
FIG. 7 is a block diagram of a local software based embodiments of the invention.
Figure 8:
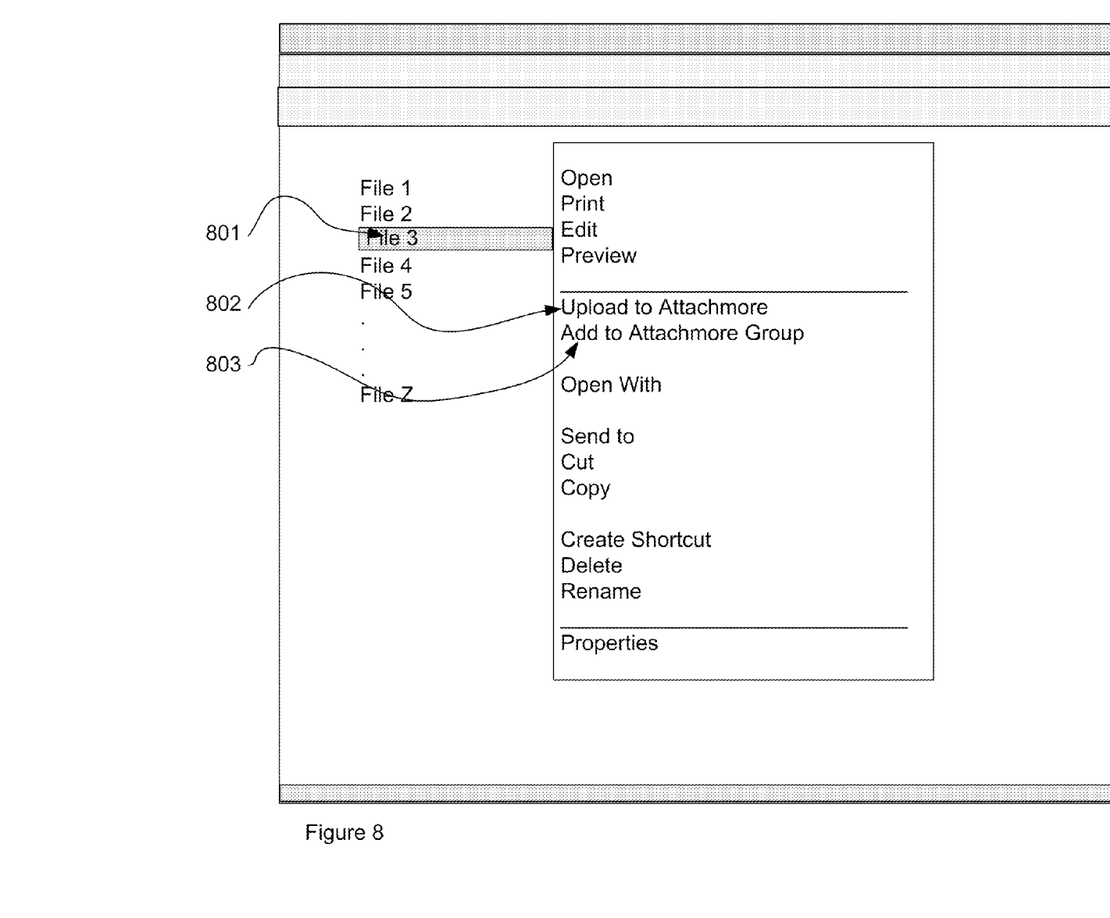
FIG. 8 is a screen image consistent with local software based embodiments of the invention.

A local software based embodiment of the invention is depicted in FIG. 7. Another embodiment uses the right click context menu capabilities of operating systems such as Windows® and Apple OSX®. Files are selected 703 using the file manager system built into the operating system or otherwise supplied. Once a file is selected a right click 704 will bring up a context menu to select actions that may be take in association with the selected file(s). The selected file set may complete the selection process in which case the files are selected for upload. If additional files are to be added to a group to be upload the files may be appended to the selected group 706 for transfer and caching. The process may be repeated 709 with selecting more files 703 until the group is complete. Both the single file selection and the group selection are completed by uploading the files 707 and using the link 708. The upload process 707 occurs in the background after a link to the transferred and cached files is provided. The link may be used in e-mail and other communication means without the need to wait for completion of the transfer. During and upon completion of the upload 707 embodiments including the status and management routines discussed earlier may be available to the user. FIG. 8 depicts a screen image consistent with an embodiment diagrammed in FIG. 7. As files are selected using the operating system file management utilities they are highlighted to indicate their selection 801. A right click, after selection provides a context menu that includes invented utilities for uploading 802 and adding to a group of files to be uploaded 803.

Figure 9:
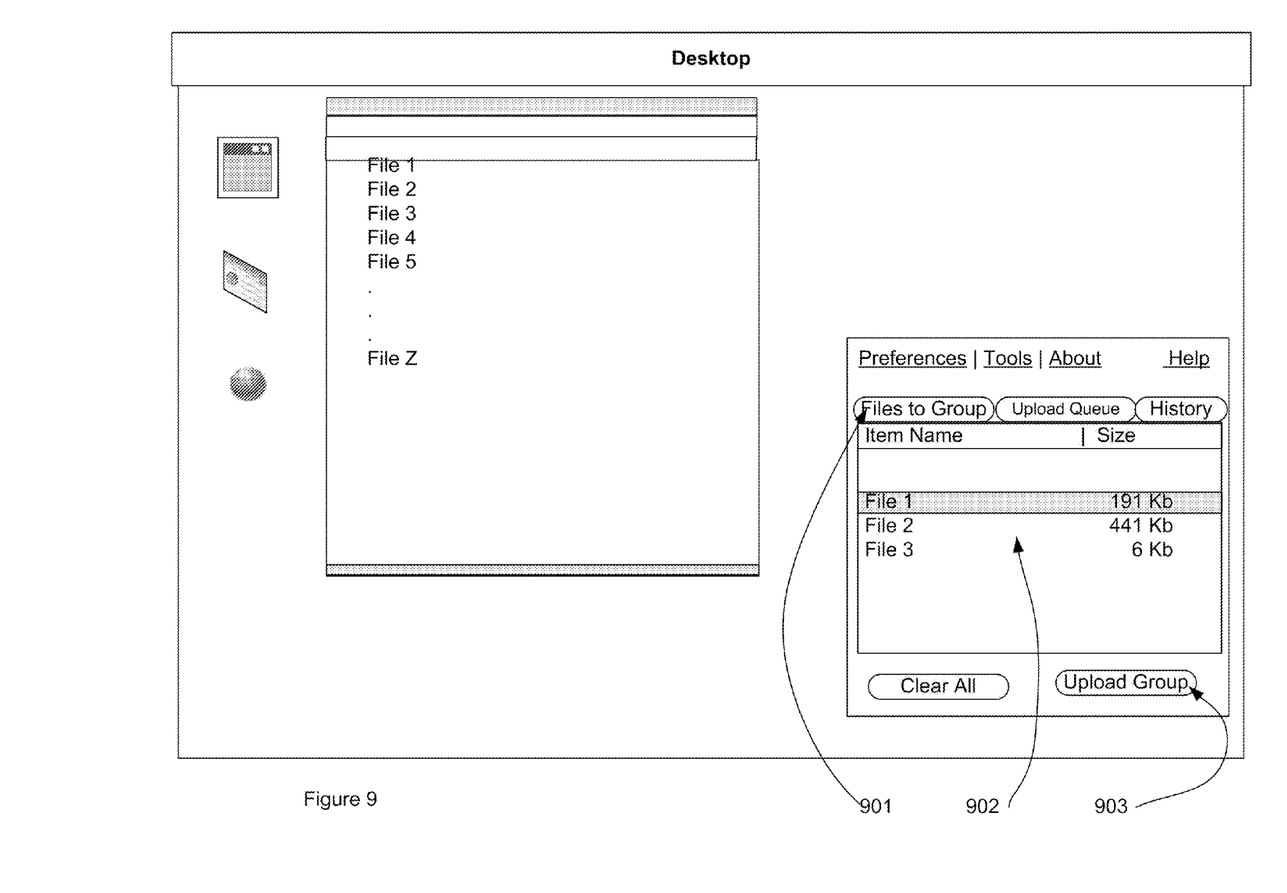
FIG. 9 is a screen image consistent with additional local software based embodiments of the invention showing file grouping and other features.

FIG. 9 depicts a screen image consistent with another embodiment of the invention. If a group of files are selected as in the embodiment discussed in FIG. 7, 706, upon completion of the selection an information screen 901 is provided. The particular selected files are enumerated 902. Once the group is complete the entire group may be transferred and cached through user selection to upload the group 903. Although the selected files are grouped into a single file for transfer and caching, the user need not move them from their original storage locations.

Figure 10:
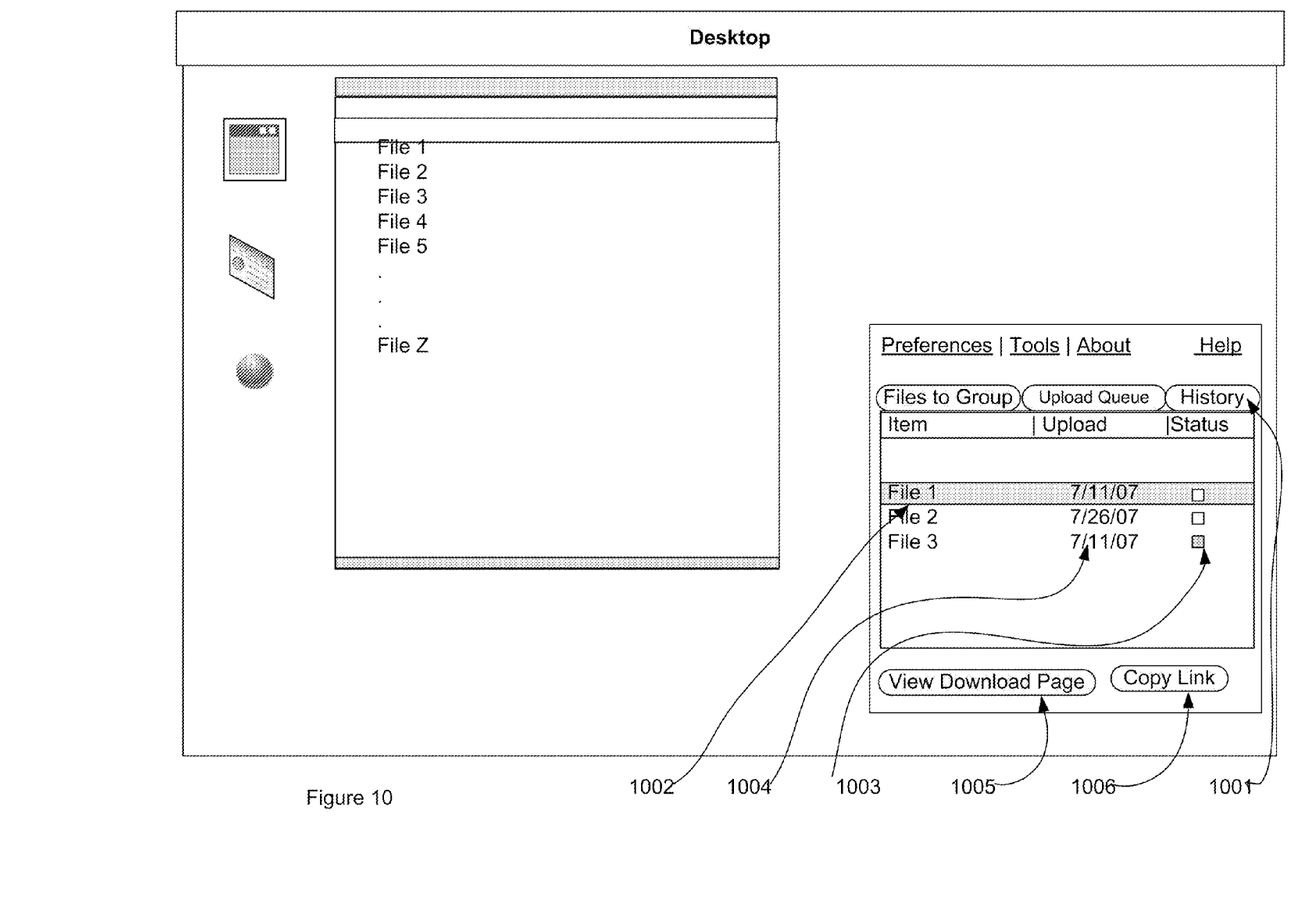
FIG. 10 is a screen image consistent with additional local software based embodiment of the invention showing an exemplary status feature of the invention.

FIG. 10 depicts a screen image consistent with another embodiment of the invention. A history utility 1001 provides information regarding past uploads 1002. Exemplary information includes status 1003 and date uploaded 1004. Additional utilities include the ability to copy the link associated with a particular file or group of files 1006. Another embodiment includes link to the download page 1005.

Figure 11:
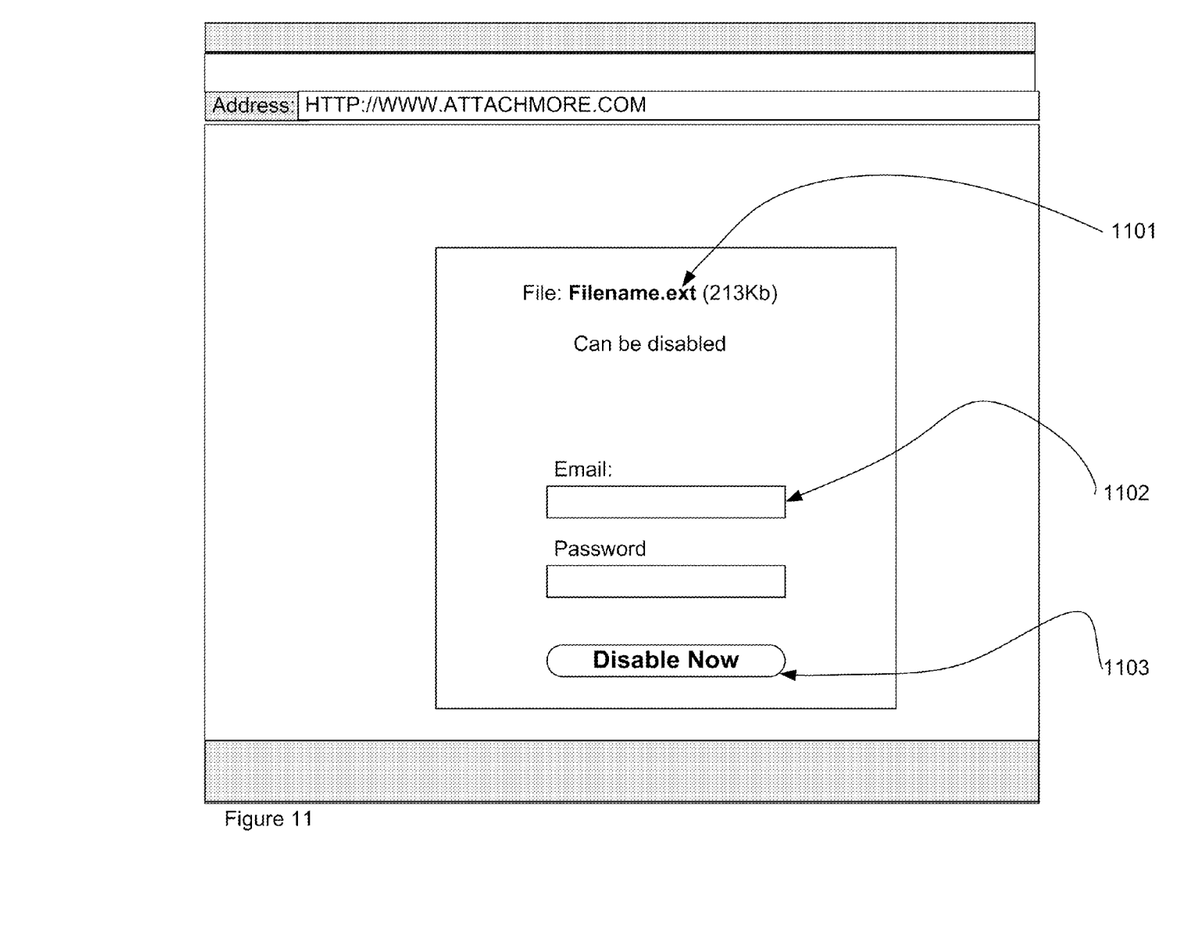
FIG. 11 is a screen image consistent with a transfer process management embodiment of the invention.

Another embodiment of the invention, consistent with the screen image of FIG. 11, allows a user to disable the link and the ability to download the previously transferred and cached. This may be useful where a file or set of files was mistakenly selected, or access was provided to the wrong users or perhaps the file has been updated. A file is selected and the download process is initiated indicating the cached file to be disabled 1101. A security procedure 1102 ensures only authorized users may disable a file. Once login information is entered the file may be disabled 1103. Disabling stops access through a previously assigned URL and erases the copy of the cached file from the server thus freeing up space for other files to be transferred and cached. In another embodiment, not shown, the files are disabled through user selected parameters such as a limited number of downloads or a time limit.

Figure 12:
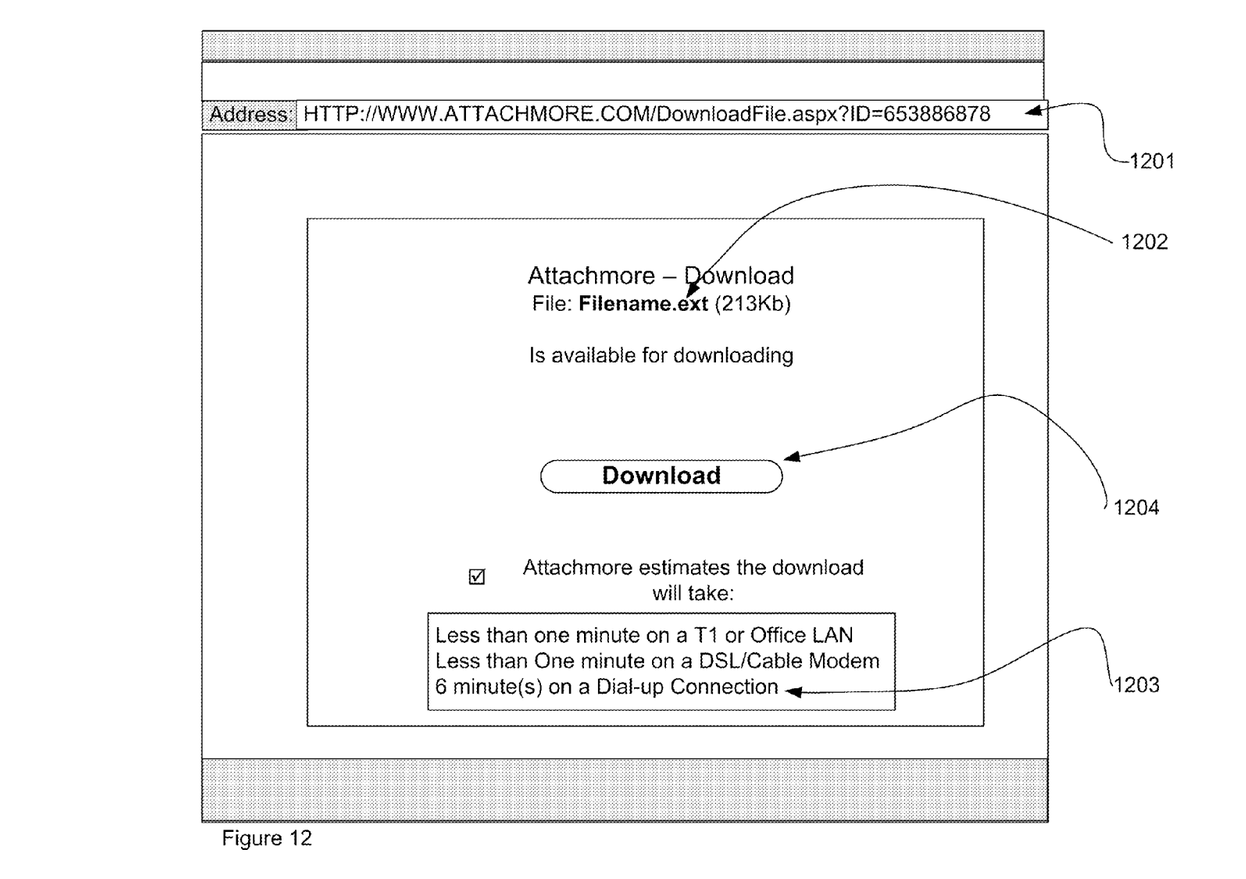
FIG. 12 is a screen image consistent with a download process embodiment of the invention.

Another embodiment of the invention, consistent with the screen image depicted in FIG. 12, enables downloading of selected files and groups of files. A URL 1201 unique of each file set is entered into a network browser. This downloads the html contents of the download page to appear in the user's browser window. An identifier 1202 of the files is presented along with an estimate 1203 of the time required to download the file or group of files. The Download process may then be initiated 1204 by selection of an include user interface action button or similar means. Once activated the user is presented, not shown, with an option to select storage location to place the files and the download process is completed.

CONCLUSIONS

A network file transfer and caching system is presented. The system provides multiple access utilities to select and transfer files to other users. The system is of particular use where the size of the files precludes transfer by other means such as e-mail attachments. The system is uniquely integrated into the operating systems by providing right click context menu file selection and process initiation. New utilities enable improved workflow by providing download information without the need to wait for completion of the network transfer process. Network transfer processes may progress in the background without user oversight or intervention. Files are cached and securely available to selected receivers of the files. The caching process may be managed by selected parameters related to number of downloads and time limits for availability of downloads.

I claim:

1. A method for transferring digital files from a source user system in a communications network to a plurality of recipient user systems in said network through a server system that comprises mass storage for digital files and is connected to said network comprising:
   a. running an application program that comprises i.) a process for communicating requests for file transfer and caching events, ii.) a process for communicating lists of selected files, iii.) a process for uploading selected files to said server system, and iv.) a process for managing the uploaded files,
   b. communicating a request for a file transfer and caching event from said source user system to said server system via said application,
   c. communicating a list of selected files for transfer and caching from said source user system to said server system via said application,
   d. generating a destination network address unique to the selected files and the requested file transfer and caching event by said server system,
   e. allocating a cache within said mass storage to said source user system at the destination network address generated by said server system,
   f. communicating said destination network address to said source user system prior to completion of the file transfer and caching event by said server system wherein said source user system can communicate said destination network address to selected recipient user systems prior to completion of the file transfer and caching event,
   g. uploading the selected files from said source user system to said cache allocated within said mass storage provided by said server system at said destination network address using said file upload process running as a background task on said source user system wherein said source user system can execute other tasks during the uploading of the selected files,
   h. managing the cache allocated within said mass storage provided by said server system at the destination network address by said source user system wherein said source user system controls the content of the cache and monitors and controls access to the cache via said application, and
   i. downloading any or all of the contents of the cache allocated within said mass storage provided by said server system at the destination network address to one or more recipient user systems designated by said source user system, which recipient user systems access the cache at the destination network address provided by said source user system.

2. The method of claim 1 wherein the said application program is implemented as a web-based application or as a locally executable application.

3. The method of claim 1 wherein the list of selected files is produced using a right-click context menu.

4. The method of claim 1 wherein file uploading can be interrupted and restarted wherein the file uploading process continues upon restarting from its state at the interruption.

5. The method of claim 1 wherein the list of selected files includes files from multiple different storage locations.

6. The method of claim 1 wherein managing the cache is accomplished using a cache management parameter set for each file transfer and caching event, said parameter set comprising a list of recipient users and limits to the number of downloads and the period of time over which downloads are allowed.

7. The method of claim 6 wherein the cache management parameter set can be overridden.

8. The method of claim 1 wherein the management of the cache includes establishing file transfer and caching status and history.

9. A method for transferring files from a source client in a client-server communications network to a plurality of recipient clients in a client-server communications network through a server system comprising mass storage for files in said client-server communications network comprising:
   a. running an application program that comprises i.) a process for communicating requests for file transfer and caching events, ii.) a process for communicating lists of selected files, iii.) a process for uploading selected files to said server system, and iv.) a process for managing the uploaded files,
   b. communicating a request for a file transfer and caching event from said source client to said server system via said application,
   c. communicating a list of selected files for transfer and caching from said source client to said server system via said application,
   d. generating a destination network address unique to the selected files and the requested file transfer and caching event by said server system,
   e. allocating a cache within said mass storage to said source client at the destination network address generated by said server system,
   f. communicating said destination network address to said source client prior to completion of the file transfer and caching event by said server system wherein said source client can communicate said destination network address to selected recipient clients prior to completion of the file transfer and caching event,
   g. uploading the selected files from said source client to a the cache allocated within said mass storage provided by said server system at said destination network address using said file upload process running as a background task on said source client wherein said source client can execute other tasks during the uploading of the selected files,
   h. managing the cache allocated within said mass storage provided by said server system at the destination network address by said source client wherein said source client controls the content of the cache and monitors and controls access to the cache via said application, and
   i. downloading any or all of the contents of the cache defined within said mass storage provided by said server system at destination network address to a one or more recipient clients designated by said source client, which recipient clients access the cache at the destination network address provided by said source client.

10. The method of claim 9 wherein said application is implemented as a web-based application available to all clients from the server or as a locally executable application at each client.

11. The method of claim 9 wherein the list of selected files is produced using a right-click context menu.

12. The method of claim 9 wherein file uploading can be interrupted and restarted wherein the file uploading process continues upon restarting from its state at the interruption.

13. The method of claim 9 wherein the list of selected files includes files from multiple different storage locations and from one or more of the plurality of clients.

14. The method of claim 9 wherein managing the cache is accomplished using a cache management parameter set for each file transfer and caching event, said parameter set comprising a list of recipient clients and limits to the number of downloads and the period of time over which downloads are allowed.

15. The method of claim 14 wherein the cache management parameter set can be overridden.

16. The method of claim 9 wherein the management of the cache includes establishing file transfer and caching status and history.

17. The method of claim 9 wherein a user of said client-server communications network may optionally access a source client to initiate a file transfer and caching event, to select files, to generate a destination network address prior to completion of the file transfer and caching event, to upload files from the source client in a background process, and to select cache management parameters; or access a recipient client to download files to the recipient client; or access the server to initiate a file transfer and caching event, to select files, to generate a destination network address prior to completion of the file transfer and caching event, to upload files from a source client in a background process, to select cache management parameters and to download files to recipient clients.

18. The method of claim 1 wherein said network includes the internet and said destination network address is a URL.

19. The method of claim 9 wherein said network includes the internet and said destination network address is a URL.

* * * * *